(12) United States Patent
Nakano et al.

(10) Patent No.: US 6,582,128 B2
(45) Date of Patent: Jun. 24, 2003

(54) BALL BEARING AND BEARING DEVICE

(75) Inventors: Yuji Nakano, Kanagawa (JP); Shinichi Natsumeda, Kanagawa (JP); Yoshiyuki Tsuruga, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/989,453

(22) Filed: Nov. 21, 2001

(65) Prior Publication Data

US 2002/0146184 A1 Oct. 10, 2002

(30) Foreign Application Priority Data

Nov. 24, 2000 (JP) .......................................... 2000-357513
Oct. 30, 2001 (JP) .......................................... 2001-333423

(51) Int. Cl.⁷ ............................................... F16C 19/00
(52) U.S. Cl. ........................................ 384/450; 384/516

(58) Field of Search ................................. 384/450, 516, 384/513, 615, 569

(56) References Cited

FOREIGN PATENT DOCUMENTS

| JP | 5-22087 | 3/1993 |
|----|---------|--------|
| JP | 6-24857 | 4/1994 |
| JP | 9-264321 | 10/1997 |
| JP | 2588842 | 11/1998 |
| JP | 2000-145794 | 5/2000 |

*Primary Examiner*—Lenard A. Footland
(74) *Attorney, Agent, or Firm*—Sughrue Mion, PLLC

(57) ABSTRACT

A deep groove ball bearing has an inner ring, an outer ring and a plurality of balls located between the inner ring and the outer ring. A profile deformation quantity of a raceway groove of the inner ring and a profile deformation quantity of the outer ring are limited to values at which the maximum surface pressure values of them are each 1.6 GPa or smaller.

9 Claims, 9 Drawing Sheets

BALL BEARING AND BEARING DEVICE

BACKGROUND OF THE INVENTION

The present invention relates to a deep groove ball bearing as a small size ball bearing, extra small ball bearing or a miniature ball bearing, which is incorporated into a bearing device of the business machine, AV home use device, HDD device and the like, and a bearing device using the deep groove ball bearing.

In related art, when a raceway groove 1 formed in a raceway of a deep groove ball bearing is worked, the absolute values of the upper and lower limit values of the groove radius of the raceway groove are selected for each bearing number of the deep groove ball bearing, and the raceway groove is worked to be within the tolerance of those values as shown in FIG. 1. Such working of raceway groove makes possible to prevent the ball from climbing over the shoulder of the raceway and suppress the influence of the groove radius on the wear and life of the ball bearing.

However, not only the groove radius of the raceway groove 1 but also a deformation of an arc profile of the raceway groove 1 affect the bearing functions, such as sound life and wear. In a case where the cross section of the raceway groove 1 is an arc profile having the groove radius as designed in average value, it the arc profile is undulated, the bearing functions are adversely affected by the undulation.

Particularly, the undulation problem of the arc profile of the raceway groove 1 is more serious in the case of the small bearing, such as the small size ball bearing, extra small ball bearing or the miniature ball bearing.

SUMMARY OF THE INVENTION

Accordingly, an object of the present invention is to provide a deep groove ball bearing and a bearing device in which the bearing functions are improved by limiting the profile deformation quantity of the raceway groove within specific ranges of values.

To achieve the above object, there is provided a deep groove ball bearing according to a first aspect of the present invention, having an inner ring, an outer ring and a plurality of balls located between the inner ring and the outer ring. In the deep groove ball bearing, a profile deformation quantity $\Delta i$ (mm) of a raceway groove of the inner ring and a profile deformation quantity $\Delta o$ (mm) of a raceway groove of the outer ring are defined by the following equations (1) and (2).

Here, as shown in FIG. 2, the profile deformation quantity means the maximum value of the amplitude of surface waviness (represented by broken line in FIG. 2) along an arc direction of the raceway groove 1 with respect to the arc profile of the raceway groove 1. For example, the profile deformation quantity is the maximum value of the amplitude of the sinusoidal wave shaped waviness.

$$\Delta i \leq 36 \left(\frac{1}{Ei'}\right)^2 \left(1.0003 + 0.5968\frac{Rxi}{Ryi}\right)\left\{1.5227 + 0.6023\ln\left(\frac{Ryi}{Rxi}\right)\right\} \frac{Rxi \cdot Ryi}{Rxi + Ryi} \quad (1)$$

wherein $$\frac{1}{Ei'} = \frac{1}{2}\left(\frac{1-vi^2}{Ei} + \frac{1-va^2}{Ea}\right)$$

$$Rxi = \frac{Da}{2} \times \frac{dm - Da\cos\alpha}{dm}$$

$$Ryi = \frac{ri \cdot Da}{2ri - Da}$$

$$\cos\alpha = \frac{ri + ro - (Da + c/2)}{ri + ro - Da}$$

$$\Delta o \leq 89 \left(\frac{1}{Eo'}\right)^2 \left(1.0003 + 0.5968\frac{Rxo}{Ryo}\right)\left\{1.5227 + 0.6023\ln\left(\frac{Ryo}{Rxo}\right)\right\} \frac{Rxo \cdot Ryo}{Rxo + Ryo} \quad (2)$$

wherein $$\frac{1}{Eo'} = \frac{1}{2}\left(\frac{1-vo^2}{Eo} + \frac{1-va^2}{Ea}\right)$$

$$Rxo = \frac{Da}{2} \times \frac{dm + Da\cos\alpha}{dm}$$

$$Ryo = \frac{ro \cdot Da}{2ro - Da}$$

$$\cos\alpha = \frac{ri + ro - (Da + c/2)}{ri + ro - Da}$$

where dm: pitch circle diameter (mm)
Da: ball diameter (mm)
c: diameter clearance (mm)
ri: radius (mm) of the raceway groove of the inner ring
ro: radius (mm) of the raceway groove of the outer ring
Ei: Young's modulus of the inner ring
vi: Poisson's ratio of the inner ring
Eo: Young's modulus of the outer ring
vo: Poisson's ratio of the outer ring
Ea: Young's modulus of the ball
va: Poisson's ratio of the ball The diameter clearance "c" is two times as large as a radial internal clearance.

The validity of the equations (1) and (2) will be described hereunder. Empirically, if a waviness of the raceway groove profile takes a sinusoidal wave in shape, a waviness length is approximately ⅓ as long as an arc length of the raceway groove.

Where a waviness length of a raceway groove profile of a ball bearing of the bearing number 696 (inner diameter=6 mm; outer diameter=15 mm; width=5 mm, bearing pitch circle diameter (dm)=10.5 mm; ball diameter=2.8 mm; curvature radius ratio of the inner ring groove=54%, and curvature radius ratio of the outer ring groove=56%) is assumed to be ⅓ as long as the groove arc length, a maximum surface pressure increases in accordance with the profile deformation quantity as shown in FIG. 3. That is, the maximum surface pressure increases in accordance with the presence of the waviness. In this case, an axial load is 6.3N, which is the pre-load usually used.

In FIG. 3, the horizontal axis represents a distance from the groove shoulder (see FIG. 1). Where the length of the waviness is ⅓ as long as the groove arc length, a contact position with the ball is located at the groove bottom and near the peak of the wave of the waviness.

As seen from FIG. 3, as the profile deformation quantity increases, the contact area of the raceway groove with the ball becomes narrow, and a maximum value Pmax of the contact surface pressure increases.

In the case of the small size ball bearing, extra small ball bearing or the miniature bearing, it is known and confirmed that when the maximum value Pmax of the contact surface pressure exceeds 1.6 GPa, abnormal phenomenon, such as an early minute wear or sound occur (see FIG. 10).

The surface pressure of a small ball bearing of the bearing number 696 was analyzed. Calculation was made about a variation of the maximum value of the contact surface pressure when the profile deformation quantity Δ is varied. The calculation results are shown in FIGS. 4 and 5.

In FIGS. 4 and 5, the horizontal axis represents Δ/δo, which has not the dimension for clarifying a magnitude of the profile deformation quantity Δ. δo is an elastic approaching quantity (Hertzian elastic approaching quantity) when the raceway groove is not deformed in its profile or when no profile deformation is present.

The Hertzian elastic approaching quantity between the rolling element and the surface of the raceway when no profile deformation is present may approximately be expressed by the following equations (3) and (4).

$$\delta i = 8\left(\frac{1}{Ei'}\right)^2 \left(1.0003 + 0.5968\frac{Rxi}{Ryi}\right)\left\{1.5227 + 0.6023\ln\left(\frac{Ryi}{Rxi}\right)\right\}\frac{Rxi \cdot Ryi}{Rxi + Ryi}(P\text{max}i)^2 \quad (3)$$

$$\delta o = 8\left(\frac{1}{Eo'}\right)^2 \left(1.0003 + 0.5968\frac{Rxo}{Ryo}\right)\left\{1.5227 + 0.6023\ln\left(\frac{Ryo}{Rxo}\right)\right\}\frac{Rxo \cdot Ryo}{Rxo + Ryo}(P\text{max}o)^2 \quad (4)$$

where Pmaxi and Pmaxo are the maximum surface pressure values of the inner and outer raceways.

The maximum surface pressure values Pmaxi and Pmaxo when the deep groove ball bearing as axially pre-loaded is not deformed in profile, are selected in design in the following manner. Those values indicate the most stringent range of values presented when the design tolerance is taken into consideration.

Pmaxi (Inner Ring Side):

1.18~1.47 GPa (120~150 kgf/mm$^2$)

Pmaxo (Outer Ring Side):

1.03~1.18 GPa (105~120 kgf/mm$^2$)

The maximum surface pressure values are determined in the following way.

For the maximum surface pressure value Pmaxi, the center value 1.32 GPa of the above range was used.

A load to the rolling element was 9.6N. For the maximum surface pressure value Pmaxo under this load, the value 1.16 GPa was used since a surface pressure at which the rolling element load is 9.6N, is 1.16 GPa.

When this value is substituted into the equations (3) and (4), then equations (5) and (6) are obtained. Accordingly, it the maximum profile deformation quantity is selected to be within a range of values which satisfies the equations (5) and (6), the adverse effects owing to the waviness, such as early wear, are prevented.

$$\Delta i \leq 2.55 \cdot 8 \cdot 1.32^2\left(\frac{1}{Ei'}\right)^2\left(1.0003 + 0.5968\frac{Rxi}{Ryi}\right)\left\{1.5227 + 0.6023\ln\left(\frac{Ryi}{Rxi}\right)\right\}\frac{Rxi \cdot Ryi}{Rxi + Ryi} = \quad (5)$$

$$36\left(\frac{1}{Ei'}\right)^2\left(1.0003 + 0.5968\frac{Rxi}{Ryi}\right)\left\{1.5227 + 0.6023\ln\left(\frac{Ryi}{Rxi}\right)\right\}\frac{Rxi \cdot Ryi}{Rxi + Ryi}$$

$$\Delta o \leq 8.30 \cdot 8 \cdot 1.16^2\left(\frac{1}{Eo'}\right)^2\left(1.0003 + 0.5968\frac{Rxo}{Ryo}\right)\left\{1.5227 + 0.6023\ln\left(\frac{Ryo}{Rxo}\right)\right\}\frac{Rxo \cdot Ryo}{Rxo + Ryo} = \quad (6)$$

$$89\left(\frac{1}{Eo'}\right)^2\left(1.0003 + 0.5968\frac{Rxo}{Ryo}\right)\left\{1.5227 + 0.6023\ln\left(\frac{Ryo}{Rxo}\right)\right\}\frac{Rxo \cdot Ryo}{Rxo + Ryo}$$

From FIGS. 4 and 5, it was found that when the ratio Δ/δo of the inner ring is 2.55 or above, and that of the outer ring is 8.30 or above, the maximum value Pmax of the contact surface pressure exceeds 1.6 GPa. Accordingly, if the profile deformation quantity is selected so as to satisfy Δi≦2.55·δo Δo≦8.30·δo, then the early wear and the like are not affected by the profile deformation even if the profile deformation occurs in the raceway groove.

The relation between the ratio (Δ/δo) and the maximum value Pmax of the contact surface pressure in a small ball bearing of the bearing number 684 (inner diameter=4 mm, outer diameter =9 mm; width=2.5 mm, bearing pitch circle diameter (dm) is 6.35 mm; ball diameter=1.6 mm; curvature radius ratio of the inner ring groove=56%, and curvature radius ratio of the outer ring groove=56%) was obtained for the inner ring and the outer ring. The results were as shown in FIGS. 6 and 7.

From FIGS. 6 and 7, it was found that when the ratio Δ/δo of the inner ring is 3.7 or above, and that of the outer ring is 10.35 or above, the maximum value Pmax of the contact surface pressure exceeds 1.6 GPa. Accordingly, the profile deformation quantity is selected so as to satisfy $$\Delta i \leq 3.7 \cdot \delta o$$

$$\Delta o \leq 10.35 \cdot \delta o$$

In the case of the bearing of the bearing number 684, the maximum surface pressure values Pmaxi and Pmaxo when no profile deformation is present are 1.32 GPa (which is the above-mentioned center value and corresponds to 2.45N of the rolling element load) for the inner ring side, and 1.08 GPa (which corresponds to 2.45N of the rolling element load) for the outer ring side.

Then, if those values are substituted into the equations (3) and (4), then equations (7) and (8) are obtained. Accordingly, if the maximum profile deformation quantity is selected to be within a range of values which satisfies the equations (7) and (8) the adverse effects owing to the waviness, such as early wear, are prevented.

$$\Delta i \leq 3.70 \cdot 8 \cdot 1.32^2 \left(\frac{1}{Ei'}\right)^2 \left(1.0003 + 0.5968\frac{Rxi}{Ryi}\right)\left\{1.5227 + 0.6023\ln\left(\frac{Ryi}{Rxi}\right)\right\}\frac{Rxi \cdot Ryi}{Rxi + Ryi} = \quad (7)$$

$$52\left(\frac{1}{Ei'}\right)^2 \left(1.0003 + 0.5968\frac{Rxi}{Ryi}\right)\left\{1.5227 + 0.6023\ln\left(\frac{Ryi}{Rxi}\right)\right\}\frac{Rxi \cdot Ryi}{Rxi + Ryi}$$

$$\Delta o \leq 10.35 \cdot 8 \cdot 1.08^2 \left(\frac{1}{Eo'}\right)^2 \left(1.0003 + 0.5968\frac{Rxo}{Ryo}\right)\left\{1.5227 + 0.6023\ln\left(\frac{Ryo}{Rxo}\right)\right\}\frac{Rxo \cdot Ryo}{Rxo + Ryo} = \quad (8)$$

$$97\left(\frac{1}{Eo'}\right)^2 \left(1.0003 + 0.5968\frac{Rxo}{Ryo}\right)\left\{1.5227 + 0.6023\ln\left(\frac{Ryo}{Rxo}\right)\right\}\frac{Rxo \cdot Ryo}{Rxo + Ryo}$$

The values of the right side of the equations (7) and (8) are larger than those of the right side of the equations (1) and (2). Accordingly, in the deep groove ball baring according to the first aspect of the present invention, the profile deformation quantities $\Delta i$ and $\Delta o$ of the inner and outer raceways are selected in value so as to satisfy the equations (1) and (2), so that the maximum surface pressure produced in the raceway groove of each inner and outer rings may always be kept at 1.6 GPa or lower.

Preferably, in the deep groove ball bearing of the present invention, a pitch circle diameter of the bearing is 21 mm or smaller.

As will be described later, it was found that where the bearing pitch circle diameter is 21 mm or smaller, the adverse effects owing to the waviness, such as the early wear, are present unless the profile deformation quantity is actively controlled as mentioned above. Therefore, in the deep groove ball bearing of the present invention, the pitch circle diameter is selected to be 21 mm or smaller.

Further, to achieve the object of the present invention, there is provided a deep groove ball bearing according to a second aspect of the present invention, having a plurality of balls located between an inner ring and an outer ring, wherein a pitch circle diameter of the bearing is 21 mm or smaller, and a profile deformation quantity of a raceway groove of the inner ring is 2 $\mu$m or smaller.

In the case of the bearing whose pitch circle diameter is within 7.5 mm to 21 mm, if the profile deformation quantity of the raceway groove of the inner ring is selected to be 2 $\mu$m or smaller, the adverse effects owing to the waviness, such as the early wear, are prevented. Therefore, in the deep groove ball bearing of the present invention, the profile deformation quantity of the raceway groove of the inner ring is selected to be 2 $\mu$m or smaller (see FIG. 14).

Preferably, in the deep groove ball bearing, the pitch circle diameter of the bearing is 5.5 mm to 7.5 mm, and the profile deformation quantity of the raceway groove of the inner ring is 1.5 $\mu$m or smaller.

In the case of the bearing whose pitch circle diameter is within 5.5 mm to 7.5 mm, if the profile deformation quantity of the raceway groove of the inner ring is selected to be 1.5 $\mu$m or smaller, the adverse effects owing to the waviness, such as the early wear, are prevented. Therefore, in the deep groove ball bearing of the present invention, the profile deformation quantity of the raceway groove of the inner ring is selected to be 1.5 $\mu$m or smaller (see FIG. 14).

More preferably, the pitch circle diameter of the bearing is 4.0 mm to 5.5 mm, and the profile deformation quantity of the raceway groove of the inner ring is 1 $\mu$m or smaller.

In the case of the bearing whose pitch circle diameter is within 4.0 mm to 5.5 mm, it the profile deformation quantity of the raceway groove of the inner ring is selected to be 1.0 $\mu$m or smaller, the adverse effects owing to the waviness, such as the early wear, are prevented. Therefore, in the deep groove ball bearing of the present invention, the profile deformation quantity of the inner raceway groove is selected to be 1.0 $\mu$m or smaller (see FIG. 14).

Further, to achieve the object of the present invention, there is provided a bearing device using any of the deep groove ball bearings mentioned above. In the bearing device, the bearing has an internal clearance when the bearing stands alone, and the bearing is assembled into the bearing device while being pre-loaded.

Any of the deep groove ball bearings is pre-loaded and then is used with a predetermined surface pressure being applied thereof.

The bearing device may be incorporated into the business machine, AV home use device, and HDD device.

Other objects, advantages and features of the invention will be apparent when carefully reading the detailed description of the invention in connection with the accompanying drawings.

DETAILED DESCRIPTION OF THE INVENTION

The preferred embodiment of the present invention will be described with reference to the accompanying drawings.

Maximum profile deformation quantities $\Delta i$ and $\Delta o$ of the raceway grooves of the inner and outer rings are obtained by substituting bearing data set for a deep groove ball bearing to be discussed, and Young's moduli and Poisson's ratios of the inner and outer rings and balls into the expressions (1) and (2).

The workpieces are worked, by grinding, such that an amplitude of an waviness along the arc direction of the profile (cross sectional profile in a plane containing the rotational axis) of each raceway groove is smaller than the profile deformation quantities $\Delta i$ and $\Delta o$, whereby forming the inner and outer rings.

Specifically, the profile deformation quantity $\Delta o$ of the raceway groove of the outer ring is selected to be 4 μm or smaller, and the profile deformation quantity $\Delta i$ of the raceway groove of the inner ring is selected in accordance with a pitch circle diameter of a bearing to be manufactured.

Namely, the profile deformation quantity $\Delta i$ of the inner ring raceway groove is selected for the pitch circle diameter as follows: 2 μm or smaller (profile deformation quantity $\Delta i$) for 7.5 mm to 21 mm (pitch circle diameter); 1.5 μm or smaller for 5.5 mm to 7.5 mm; and 1 μm or smaller for 4 mm to 5.5 mm.

If the deformation quantity of the groove profile of the raceway groove, for example, the profile deformation quantity of the inner ring raceway groove, is selected as mentioned above, a maximum contact pressure at the raceway groove is reduced to be below 1.6 GPa. As a result, it is prevented that the early wear is caused by a waviness along the arc direction of the raceway groove.

Figure 1:
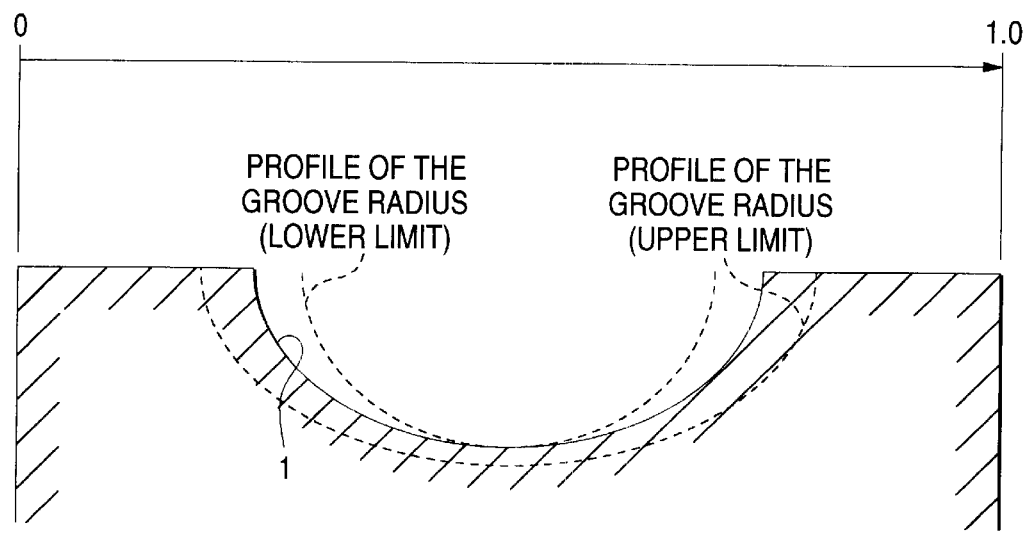
FIG. 1 is a cross sectional view showing a tolerance of a cross section profile of a raceway groove.
Figure 2:
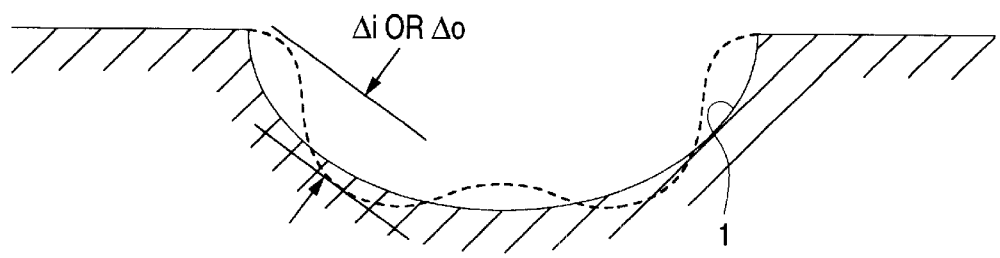
FIG. 2 is a diagram for explaining, in a model form, an waviness and a profile deformation, which possibly occurs in the raceway groove.
Figure 3:
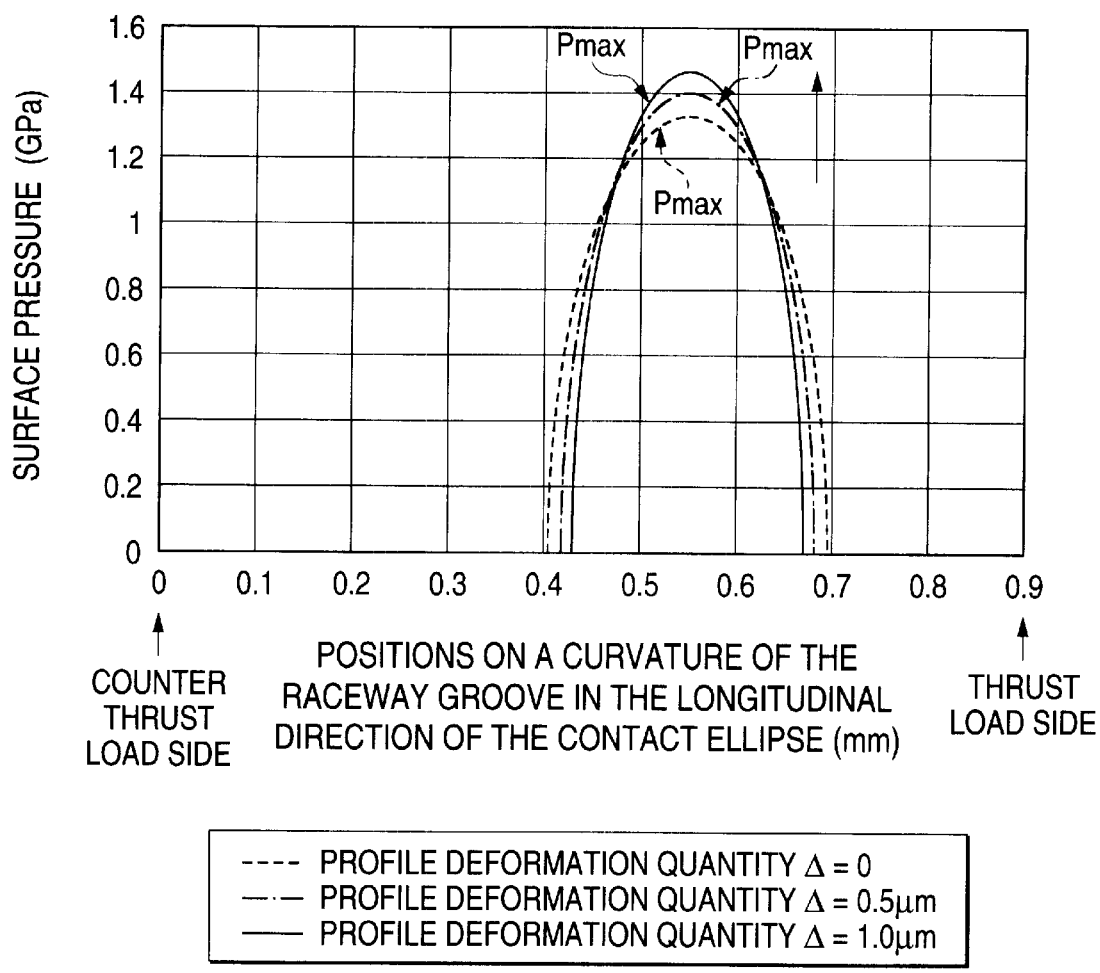
FIG. 3 is a graph showing a relation between a profile deformation quantity and a surface pressure.
Figure 4:
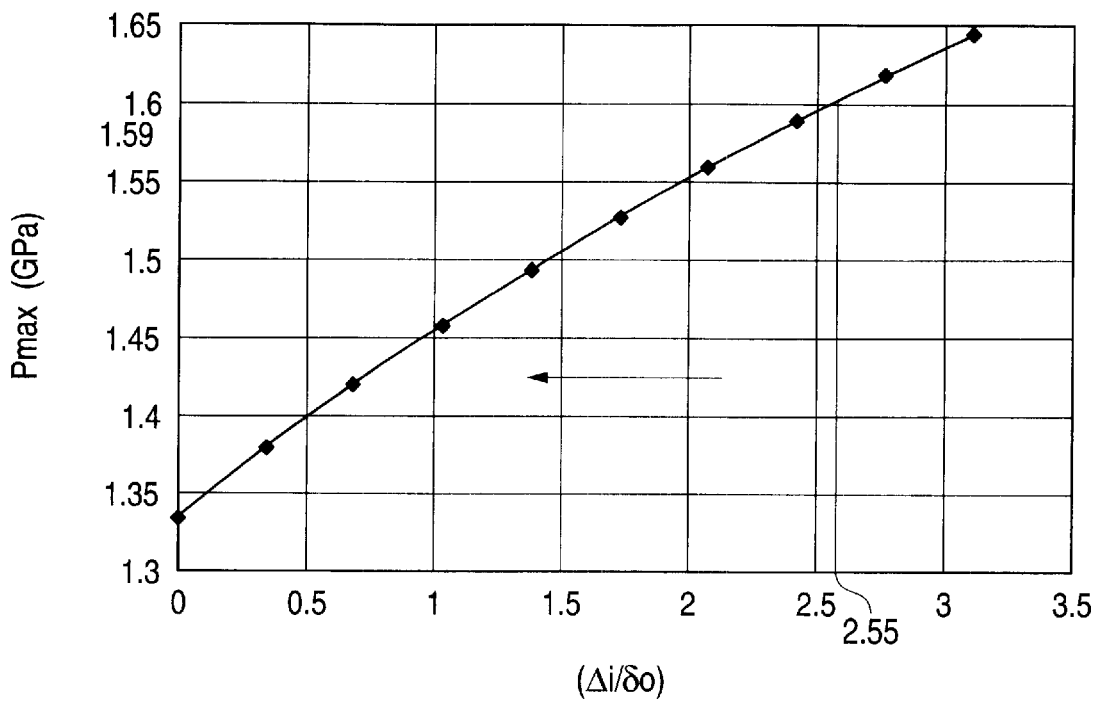
FIG. 4 is a graph showing a relation between ($\Delta i/\delta o$) and a maximum surface pressure for a bearing of the bearing number 696.
Figure 5:
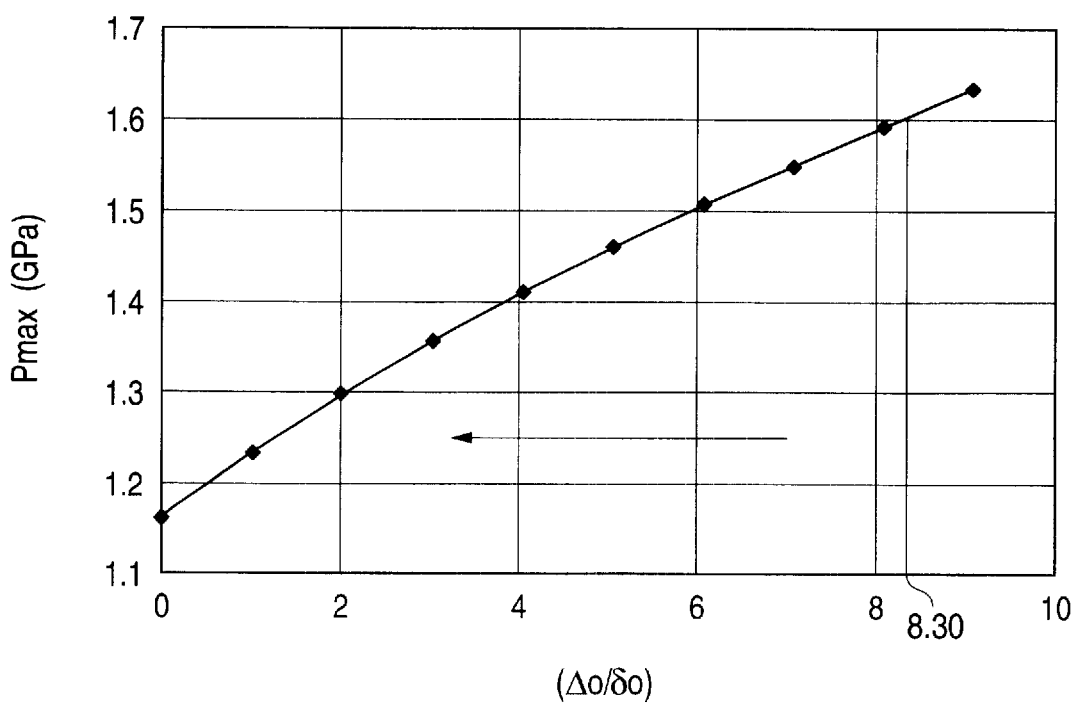
FIG. 5 is a graph showing a relation between ($\Delta o/\delta o$) and a maximum surface pressure for a bearing of the bearing number 696.
Figure 6:
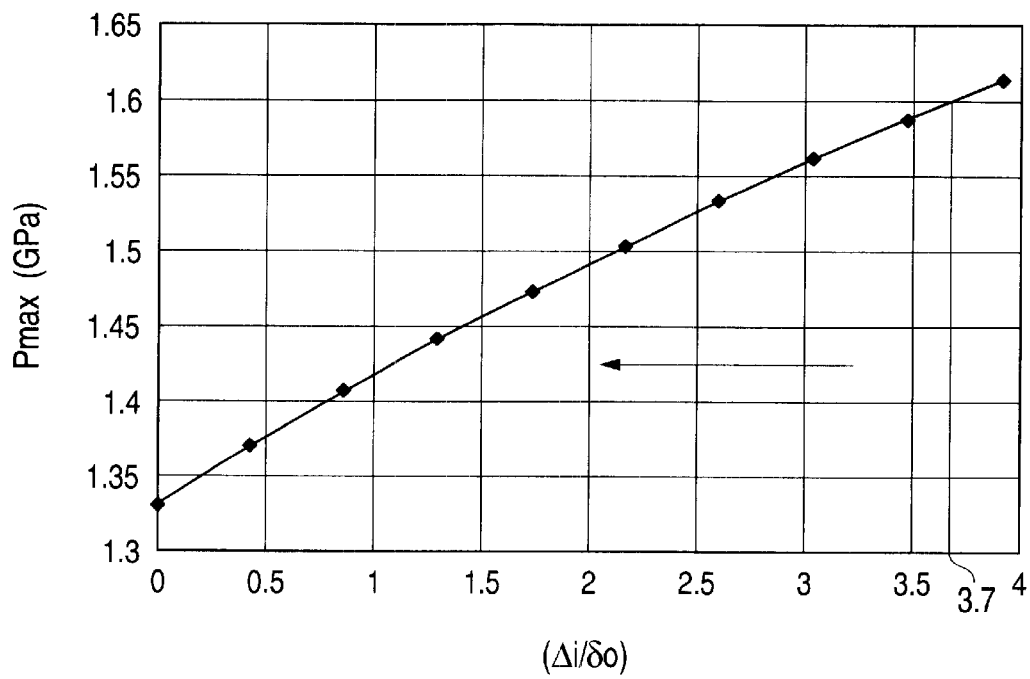
FIG. 6 is a graph showing a relation between ($\Delta i/\delta o$) and a maximum surface pressure for a bearing of the bearing number 684.
Figure 7:
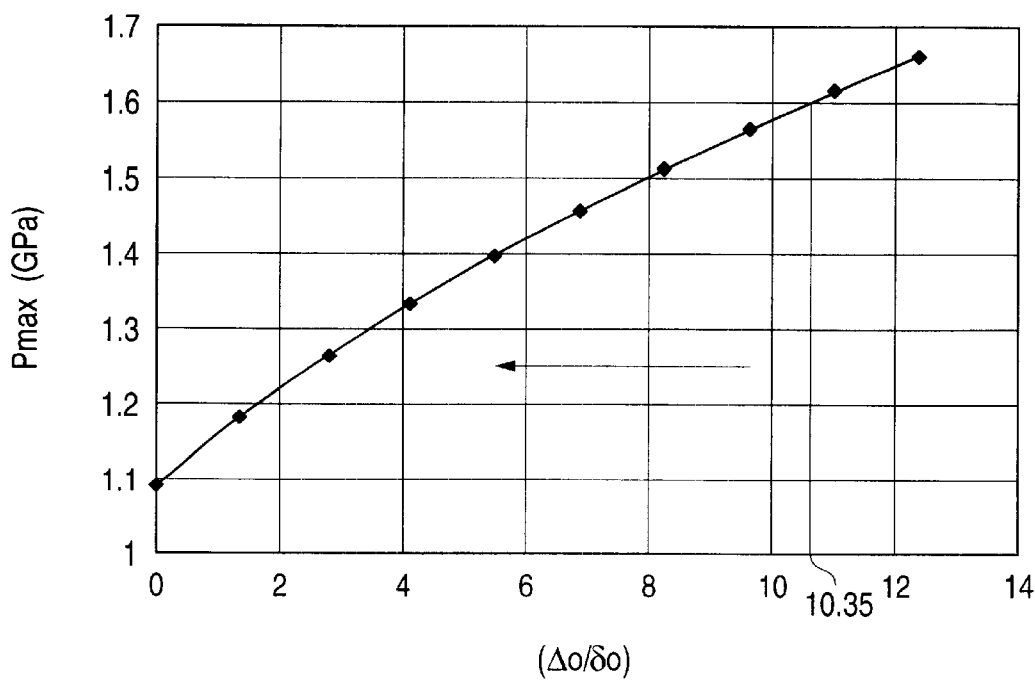
FIG. 7 is a graph showing a relation between ($\Delta o/\delta o$) and a maximum surface pressure for a bearing of the bearing number 684.
Figure 8:
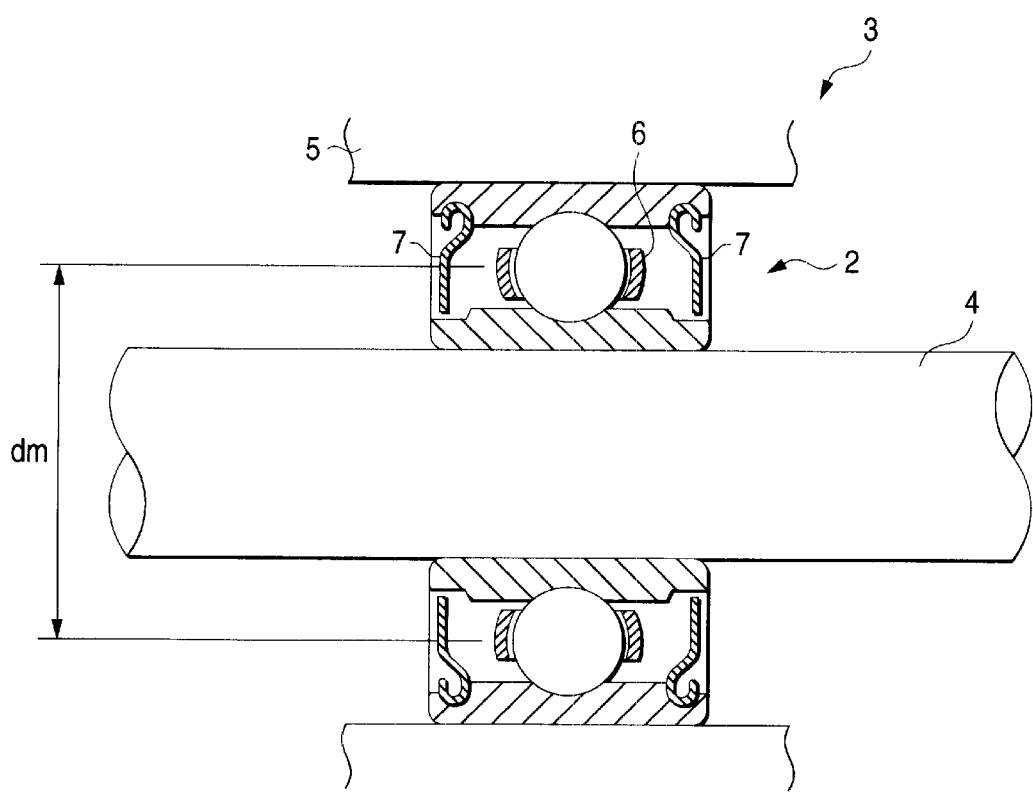
FIG. 8 is a view exemplarily showing an example of a deep groove ball bearing incorporated into a bearing device.

In a case where a deep groove ball bearing 2 is assembled between a housing 5 and a shaft 4 of a bearing device 3, as shown in FIG. 8, a predetermined axial pre-load is applied to the bearing 2 through the shaft 4 and the housing 5 so as to obtain suitable running accuracy. As a result, a surface pressure corresponding to a pre-load applied is generated in the raceway groove of the bearing 2 assembled. The generated surface pressure is proportional to the deformation quantity of the raceway groove profile. If the deformation quantity of the raceway groove profile is selected so as to be within the ranges of values in the deep groove ball bearings of the present invention, the increase of the surface pressure is suppressed. As a result, it is prevented that the early wear is caused by a waviness along the arc direction of the raceway groove, and hence the life of the bearing device 3 is improved.

The bearing device 3 according to the present invention is preferably incorporated in devices where noise reduction is required, such as business machine, AV home use device, and HDD device.

EXAMPLE

For a bearing whose profile deformation quantity is extremely small, a rotation test was conducted while changing a surface pressure, and a vibration acceleration of it was measured.

The bearing used in the rotation test was similar to that illustrated in FIG. 8. A sound life tester as shown in FIG. 9 was used for the rotation test.

The bearing 2 tested was a ball bearing of the bearing number 695 (inside diameter is 5 mm, outside diameter is 13 mm, width is 4 mm, ball diameter is 2 mm, and pitch circle diameter is 9 mm). In FIG. 8, reference numeral 6 is a retainer, and 7 is a shield.

Figure 9:
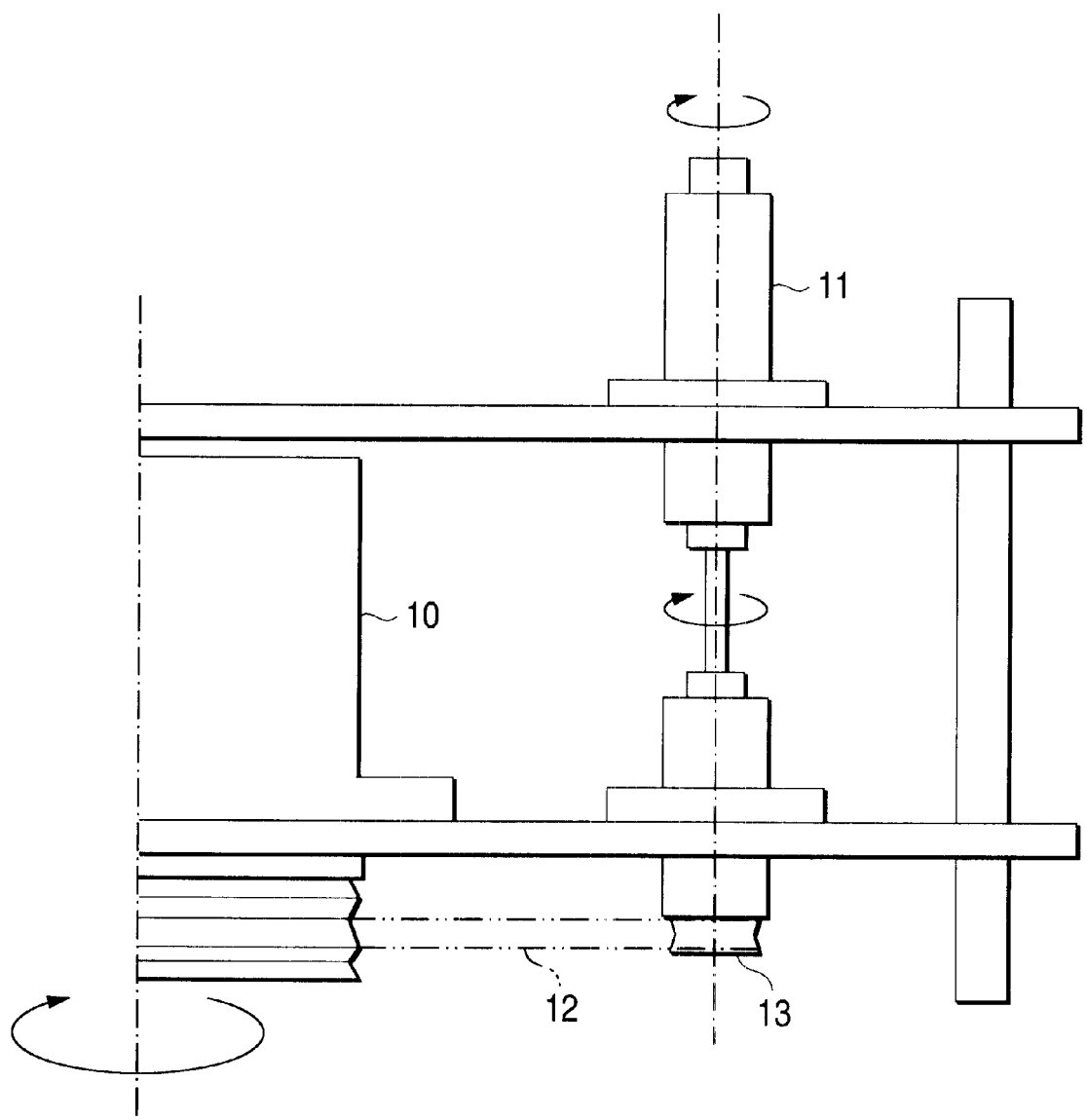
FIG. 9 is a view showing an sound life tester.

The sound life tester used was constructed as shown in FIG. 9. As shown in FIG. 9, the tested bearing placed in a housing 11 is rotated by a motor 10, through a belt 12 and a pulley 13. The sound life tester was placed in a constant temperature oven set at 60° C. The inner ring of the tested bearing in the housing 11 was rotated at a rotational speed of 10000 rpm for a predetermined time period. A vibration acceleration produced in the bearing at that time was measured by an acceleration sensor attached to the housing 11.

Figure 10:
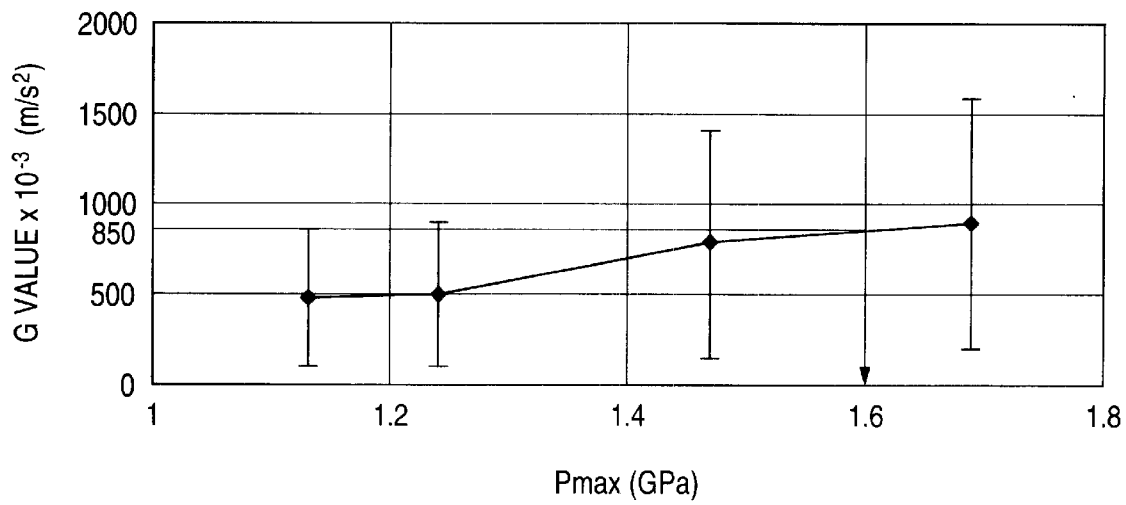
FIG. 10 is a graph showing a relation between a maximum surface pressure and G values.

The test results were as shown in FIG. 10.

Requirement, which is imposed on the nose generated from the business machine, AV home use device, HDD device and the like to secure comfortable use environments and good working efficiency, is that under the test conditions of this example, a sound generated during the bearing rotation is set at a value corresponding to $850 \times 10^{-3}$ (m/s$^2$) or smaller (G value).

As seen from FIG. 10, to limit the G value to be $850 \times 10^{-3}$ (m/s$^2$) or smaller in average value in order to prevent an early sound increasing, it needs to select a maximum contact surface pressure Pmax to be 1.6 GPa or smaller.

Another rotation test, like the above-mentioned rotation test, was conducted. In this test, a bearing used had specifications: inner diameter=5 mm; outer diameter=13 mm; width=3 mm; bearing pitch circle diameter=9 mm; inner ring groove curvature radius ratio=53%; and outer ring groove curvature radius ratio=53%. In the test, the G values were measured for various profile deformation quantities. The results of the measurement are shown in FIG. 11.

Figure 12:
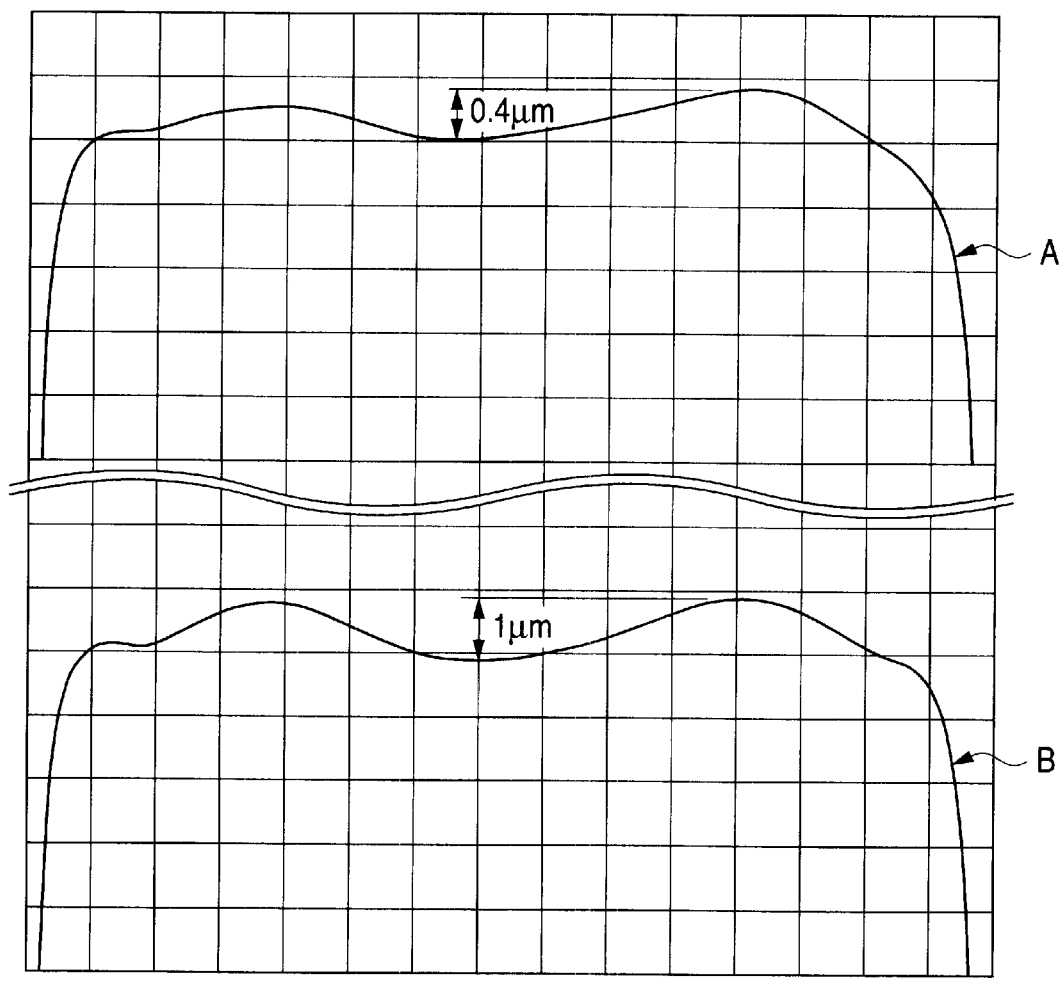
FIG. 12 is a diagram showing examples of the profile deformations.
Figure 13:
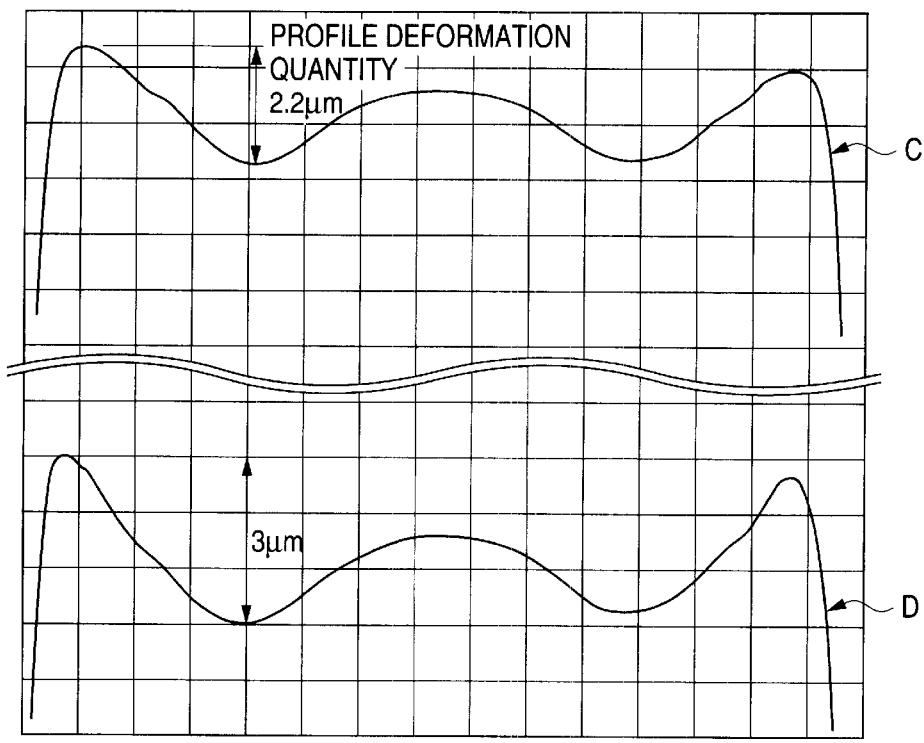
FIG. 13 is a diagram showing additional examples of the profile deformations.

Typical profiles of some raceway grooves deformed in profile are shown in FIGS. 12 and 13. In FIG. 12, character A is a profile of a raceway groove whose profile deformation quantity was 0.4 μm; B is a profile of a raceway groove whose profile deformation quantity was 1 μm. In FIG. 13, character C is a profile of a raceway groove whose profile deformation quantity was 2.2 μm; D is a profile of a raceway groove whose profile deformation quantity was 3 μm.

Figure 11:
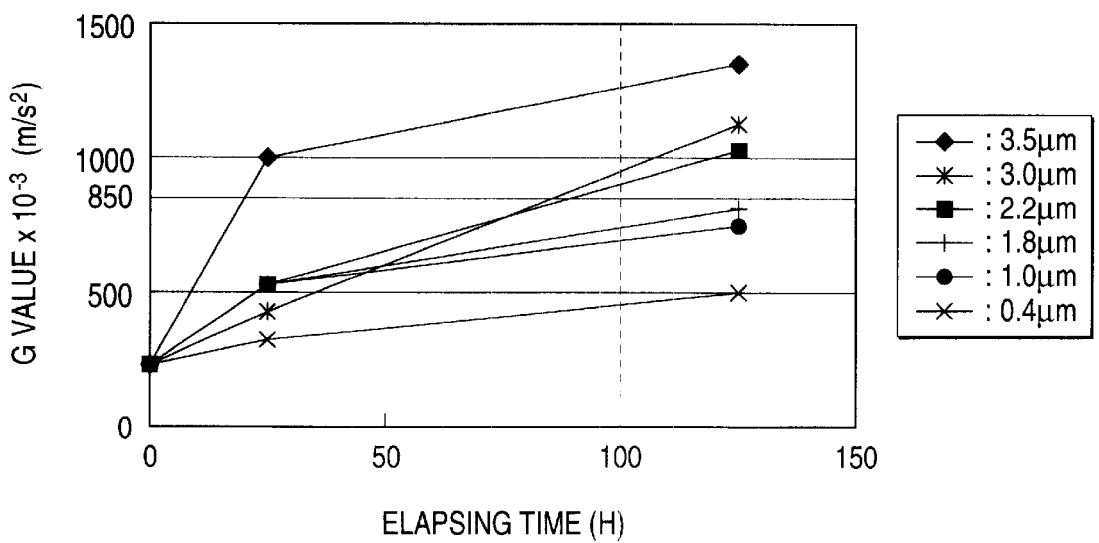
FIG. 11 is a graph showing a relation between G values for profile deformation quantities and elapsing time.

As seen from FIG. 11, for the bearing whose pitch circle diameter is 9 mm, a sound generated during the bearing rotation is suppressed to be $850 \times 10^{-3}$ (m/s$^2$) or smaller in G value for a long time (100 hours or longer) when the profile deformation quantity is about 2 μm or smaller.

Figure 14:
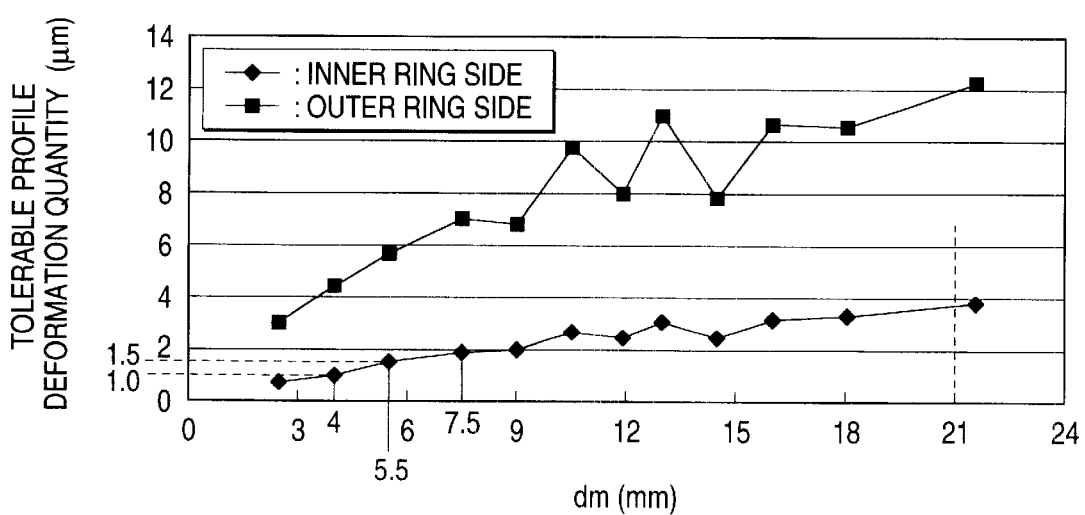
FIG. 14 is a graph showing a relation between a pitch circle diameter and the profile deformation quantity for the inner and outer rings.

The tolerable profile deformation quantities were calculated for different bearing dimensions corresponding to the test results, and a variation of a tolerable profile deformation quantity (a maximum profile deformation quantity tolerated) with respective to a bearing pitch circle diameter dm was obtained as shown in FIG. 14.

In the graph, the tolerable profile deformation quantity vary widely. The reason for this is that the radius of curvature of the raceway groove was changed in the calculation. This fact teaches that the tolerable profile deformation quantity varies depending on the radius of curvature of the raceway groove. Although the tolerable profile deformation quantity is affected by the radius of curvature of the raceway groove, its value becomes larger as the bearing dimension, typically the bearing pitch circle diameter, becomes larger.

FIG. 14 shows that the tolerable profile deformation amount of the raceway groove of the inner ring is stricter than that of the raceway groove of the outer ring. Accordingly, it is found that in the case of the bearing whose pitch circle diameter is 21 mm or longer, the sound generated during the rotation may be $850 \times 10^{-3}$ (m/s$^2$) or smaller in G value if the profile deformation quantity of the inner ring raceway groove is reduced to be 4 μm or smaller. The present working technique automatically provides the bearing whose profile deformation quantity is 4 μm or smaller, almost without applying any artificial control to it. Thus, the control of the profile deformation quantity is required only in the case of the bearing whose pitch circle diameter is 21 mm or smaller.

FIG. 14 also shows that for the raceway groove of the outer ring, if the pitch circle diameter is 4.0 mm or larger, it is sufficient to reduce the profile deformation quantity to be 4 μm or smaller. Therefore, there is no need of using any artificial control in particular so long as the present working technique is used. In other words, it is sufficient to control the profile deformation quantity of the raceway groove of the inner ring.

Further, FIG. 14 shows the following facts: the tolerable profile deformation quantity of the raceway groove of the inner ring is 2 μm when the bearing pitch circle diameter is 7.5 mm; it is 1.5 μm when the pitch circle diameter is 5.5 mm; and it is 1 μm when the pitch circle diameter is 4.0 mm.

From the fact, it is seen that, to completely prevent the early wear owing to the waviness of the raceway groove, it is necessary to control the profile deformation quantity in accordance with the bearing pitch circle diameter, as follows: 2 μm or smaller (profile deformation quantity) for 7.5 mm to 21 mm (pitch circle diameter); 1.5 μm or smaller for 5.5 mm to 7.5 mm; and 1 μm or smaller for 4 mm to 5.5 mm.

As seen from the foregoing description, the present invention succeeds in preventing the adverse effect by the waviness of the raceway groove profile, and in completely eliminating the early wear caused by the waviness.

What is claimed is:

1. A groove ball bearing comprising: an inner ring; an outer ring; and a plurality of balls located between the inner ring and the outer ring, wherein a profile deformation quantity Δi (mm) of a raceway groove of the inner ring and a profile deformation quantity Δo (mm) of a raceway groove of the outer ring are defined by the following equations (1) and (2)

$$\Delta i \leq 36\left(\frac{1}{Ei'}\right)^2 \left(1.0003 + 0.5968\frac{Rxi}{Ryi}\right)\left\{1.5227 + 0.6023\ln\left(\frac{Ryi}{Rxi}\right)\right\}\frac{Rxi \cdot Ryi}{Rxi + Ryi} \quad (1)$$

wherein $$\frac{1}{Ei'} = \frac{1}{2}\left(\frac{1-vi^2}{Ei} + \frac{1-va^2}{Ea}\right)$$

$$Rxi = \frac{Da}{2} \times \frac{dm - Da\cos\alpha}{dm}$$

$$Ryi = \frac{ri \cdot Da}{2ri - Da}$$

$$\cos\alpha = \frac{ri + ro - (Da + c/2)}{ri + ro - Da}$$

$$\Delta o \leq 89\left(\frac{1}{Eo'}\right)^2 \left(1.0003 + 0.5968\frac{Rxo}{Ryo}\right) \quad (2)$$

$$\left\{1.5227 + 0.6023\ln\left(\frac{Ryo}{Rxo}\right)\right\}\frac{Rxo \cdot Ryo}{Rxo + Ryo}$$

wherein $$\frac{1}{Eo'} = \frac{1}{2}\left(\frac{1-vo^2}{Eo} + \frac{1-va^2}{Ea}\right)$$

$$Rxo = \frac{Da}{2} \times \frac{dm + Da\cos\alpha}{dm}$$

$$Ryo = \frac{ro \cdot Da}{2ro - Da}$$

$$\cos\alpha = \frac{ri + ro - (Da + c/2)}{ri + ro - Da}$$

where dm: pitch circle diameter (mm)

Da: ball diameter (mm)

c: diameter clearance (mm)

ri: radius (mm) of the raceway groove of the inner ring ro: radius (mm) of the raceway groove of the outer ring Ei: Young's modulus of the inner ring vi: Poisson's ratio of the inner ring Eo: Young's modulus of the outer ring vo: Poisson's ratio of the outer ring Ea: Young's modulus of the ball va: Poisson's ratio of the ball.

2. The groove ball bearing according to claim 1, wherein the pitch circle diameter of said bearing is 21 mm or smaller.

3. A bearing device using said groove ball bearing as defined in claim 1, wherein said bearing has an internal clearance when said bearing stands alone, and said bearing is assembled into said bearing device while being preloaded.

4. The bearing device according to claim 3, wherein said bearing device is used in the business machine, AV home use device, and HDD device.

5. A ball bearing comprising: an inner ring; an outer ring; and a plurality of balls located between the inner ring and the outer ring, wherein a pitch circle diameter of said bearing is 21 mm or smaller, and a profile deformation quantity of a raceway groove of the inner ring is 2 μm or smaller.

6. The ball bearing according to claim 5, wherein the pitch circle diameter of said bearing is 5.5 mm to 7.5 mm, and the profile deformation quantity of the raceway groove of the inner ring is 1.5 μm or smaller.

7. The ball bearing according to claim 5, wherein the pitch circle diameter of said bearing is 4.0 mm to 5.5 mm, and the profile deformation quantity of the raceway groove of the inner ring is 1 μm or smaller.

8. A bearing device using said ball bearing as defined in claim 5, wherein said bearing has an internal clearance when said bearing stands alone, and said bearing is assembled into said bearing device while being pre-loaded.

9. The bearing device according to claim 8, wherein said bearing device is used in the business machine, AV home use device, and HDD device.

* * * * *